(12) United States Patent
MacNaughton et al.

(10) Patent No.: US 7,991,775 B2
(45) Date of Patent: Aug. 2, 2011

(54) GLOBAL CHECKPOINT SCN

(75) Inventors: Neil MacNaughton, Los Gatos, CA (US); Tirthankar Lahiri, Palo Alto, CA (US); Varun Malhotra, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 416 days.

(21) Appl. No.: 12/244,640

(22) Filed: Oct. 2, 2008

(65) Prior Publication Data

US 2010/0036843 A1 Feb. 11, 2010

Related U.S. Application Data

(60) Provisional application No. 61/087,553, filed on Aug. 8, 2008.

(51) Int. Cl.
*G06F 17/30* (2006.01)
(52) U.S. Cl. . 707/736; 707/741; 707/750; 707/999.003; 707/999.005; 704/9; 715/231
(58) Field of Classification Search ............... 707/736, 707/741, 750, 999.003, 999.005; 704/9; 715/231; 705/10
See application file for complete search history.

(56) References Cited

U.S. PATENT DOCUMENTS

| | | |
|---|---|---|
| 5,333,265 A | 7/1994 | Orimo et al. |
| 5,423,037 A | 6/1995 | Hvasshovd |
| 5,454,102 A | 9/1995 | Tang et al. |
| 5,555,404 A | 9/1996 | Torbjørnsen et al. |
| 5,574,906 A | 11/1996 | Morris |
| 5,581,753 A | 12/1996 | Terry et al. |
| 5,806,076 A | 9/1998 | Ngai et al. |
| 5,870,758 A | 2/1999 | Bamford et al. |
| 5,924,096 A | 7/1999 | Draper et al. |
| 5,956,731 A | 9/1999 | Bamford et al. |
| 5,974,427 A | 10/1999 | Reiter |
| 5,983,277 A * | 11/1999 | Heile et al. .......... 709/232 |
| 5,991,771 A | 11/1999 | Falls et al. |
| 6,014,669 A | 1/2000 | Slaughter et al. |
| 6,192,377 B1 | 2/2001 | Ganesh et al. |
| 6,298,319 B1 * | 10/2001 | Heile et al. .......... 703/26 |
| 6,353,835 B1 | 3/2002 | Lieuwen |
| 6,393,485 B1 | 5/2002 | Chao et al. |
| 6,516,327 B1 | 2/2003 | Zondervan et al. |
| 6,574,717 B1 | 6/2003 | Ngai et al. |

(Continued)

FOREIGN PATENT DOCUMENTS

EP 0 501 180 A 9/1992

OTHER PUBLICATIONS

Bober, Paul M., et al., "On Mixing Queries and Transactions via Multiversion Locking", Computer Sciences Department, University of Wisconsin, 1992, pp. 535-545.

(Continued)

*Primary Examiner* — Jean M Corrielus
(74) *Attorney, Agent, or Firm* — Hickman Palermo Truong & Becker LLP

(57) ABSTRACT

Described herein are techniques for generating a global checkpoint system change number and computing a snapshot query using the global checkpoint system change number without a need to acquire global locks. In many cases, the need to acquire global locks is eliminated, thereby saving the overhead attendant to processing global locks.

14 Claims, 3 Drawing Sheets

U.S. PATENT DOCUMENTS

| | | | |
|---|---|---|---|
| 6,691,139 B2 | 2/2004 | Ganesh et al. | |
| 6,839,751 B1 | 1/2005 | Dietz et al. | |
| 7,024,656 B1 | 4/2006 | Ahad | |
| 7,076,508 B2 | 7/2006 | Brourbonnais et al. | |
| 7,200,623 B2* | 4/2007 | Chandrasekaran et al. | 1/1 |
| 7,222,136 B1 | 5/2007 | Brown et al. | |
| 7,287,034 B2 | 10/2007 | Wong et al. | |
| 7,290,017 B1 | 10/2007 | Wang et al. | |
| 7,296,039 B2* | 11/2007 | Chandrasekaran et al. | 1/1 |
| 7,334,004 B2 | 2/2008 | Ganesh et al. | |
| 7,464,113 B1 | 12/2008 | Girkar et al. | |
| 7,577,690 B2* | 8/2009 | Chandrasekaran et al. | 1/1 |
| 7,644,084 B2 | 1/2010 | Rapp | |
| 7,734,580 B2 | 6/2010 | Lahiri et al. | |
| 2002/0133508 A1 | 9/2002 | Larue et al. | |
| 2002/0165724 A1 | 11/2002 | Blankesteijn | |
| 2010/0036843 A1* | 2/2010 | MacNaughton et al. | 707/8 |

OTHER PUBLICATIONS

Mohan, C., et al., "Efficient and Flexible Methods for Transient Versioning of Records to Avoid Locking by Read-Only Transactions", XP000393583, IBM Almaden Research Center, publication date Feb. 6, 1992, pp. 124-133.

European Patent Office, "Communication—European Search Report", Application No. 07003358.4-2201, dated May 18, 2007, 8 pages.

Teschke et al., "Concurrent Warehouse Maintenance Without Comprising Session Consistency", University of Erlangen-Nuremberg., Pub 1998, 10 pages.

Vassilakis et al., "Implementation of Transaction and Concurrency Control Support in a Temporal DBMS", Department of Information Systems, University of Athens, vol. 23 No. 5. Pub 1998, 16 pages.

* cited by examiner

GLOBAL CHECKPOINT SCN

PRIORITY CLAIM

This application claims the benefit under 35 U.S.C. 119(e) of provisional Application No. 61/087,553, filed Aug. 8, 2008, the entire contents of which are hereby incorporated by reference.

FIELD OF THE INVENTION

The present invention relates to accessing data stored persistently in computer systems, and in particular, to efficiently retrieving data from a persistent storage by nodes in a multi-node system.

BACKGROUND OF THE INVENTION

In a multi-processing system running in a multi-node network, processes often compete for "shared resources," such as for example, data blocks in a database. Some of the shared resources may be concurrently accessed by a number of processes, while other shared resources may be accessed only by one process at a time. Consequently, various access-synchronization mechanisms have been developed to manage access the shared resources.

According to one synchronization-scheme, access to shared resources is based on the usage of "locks." Once an appropriate lock is granted to the process, the process may access the shared resource, and use the resource until for example, the lock is relinquished, revoked, or otherwise terminated.

"Lock-based" system may include two types of locks: locks permitting concurrent access to a shared resource, and locks permitting exclusive access to the shared resource. For example, a "shared read lock" may be granted to one or more processes to allow the processes to concurrently read data from a persistent storage, whereas an "exclusive write lock" can be granted only to one process at the time, and allows only one process at the time to write data to the persistent storage.

Complexity of a "lock-based" synchronization scheme usually depends on the complexity of the multi-processing system. The more complex the multi-processing system is, the more complex "lock-based" synchronization scheme usually is. Due to their global scope, locks in the multi-node systems are often referred to as "global locks."

Global locks are used to synchronize access of various processes to shared resources distributed on various nodes. For example, in order for a process on one node to access a shared resource residing on another node, the process has to send an appropriate request to a global lock manager and receive from it a "global lock."

Acquiring global locks is expensive in terms of bandwidth, time and computational complexity. For example, acquiring and issuing a global lock may entail extensive communications between the nodes, execution of a number of instructions and creation of the data structures.

Further, acquiring and issuing global locks may entail a significant time delay. For example, if a process wants to read a particular data block from the persistent storage, the lock manager has to first check whether the particular data block in the persistent storage is not "stale." The data block may be "stale" if another process has already received a global "exclusive write lock" for it and read the particular data block from the persistent storage to a cache. Thus, if a process wants to read the particular data that is "stale," the global lock manager waits until the global "exclusive write lock" is relinquished. Subsequently, the lock manager issues the global shared lock to the requesting process. This type of "waiting" may contribute to a significant time delay before the requesting process may actually access the particular data block.

As clearly shown, techniques are needed to reduce the overhead of global locks, when nodes access data in a multi-node system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
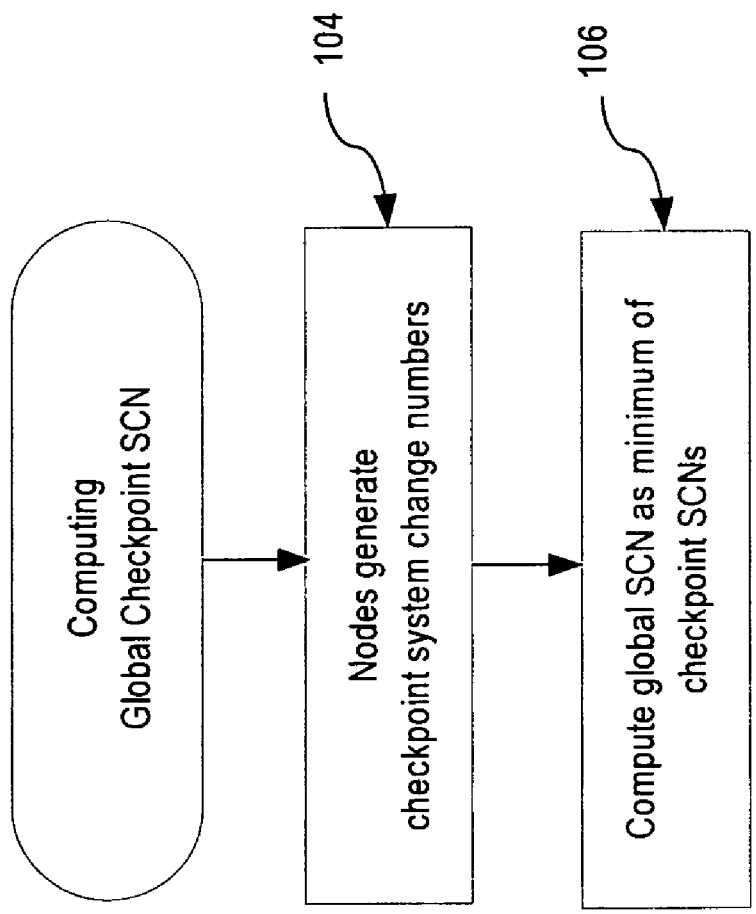
FIG. 1 is a flow chart depicting a process of generating a global checkpoint system change number according to an embodiment of the present invention.

A computer-implemented method for generating a global checkpoint system change number and computing a snapshot query using the global checkpoint system change number are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques for generating a global checkpoint system change number and using the global checkpoint system change number to compute a snapshot query. In many cases, by using the global checkpoint system change number, the need to acquire global locks is eliminated, thereby saving the overhead attendant to processing snapshot query requests.

According to an embodiment of the present invention, the techniques may be performed by a multi-node database server. A multi-node database server comprises multiple database instances running on a group of interconnected nodes managing access to a database. The nodes in the group may be in the form of computers (e.g. work stations, personal computers) interconnected via a network. Alternatively, the nodes may be the nodes of a grid, where each node is interconnected on a rack. The grid may host multiple multi-node database servers.

One or more database servers may manage a database. A database comprises data and metadata that is stored on a persistent memory mechanism, such as a set of hard disks. Such data and metadata may be stored in a database logically, for example, according to relational and/or object-relational database constructs. Database Applications interact with a database server by submitting to the database server commands that cause the database server to perform operations on data stored in a database. A database command may be in the form of a database statement. For the database server to process the database statements, the database statements must conform to a database language supported by the database server. One non-limiting database language supported by many database servers is SQL, including proprietary forms of SQL supported by such database servers as Oracle, (e.g. Oracle Database 10 g). SQL data definition language ("DDL") instructions are issued to a database server to create or configure database objects, such as tables, views, or complex data types.

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A data block is an atomic unit of persistent storage used by a DBMS to store database records (e.g. rows of a table). When a row needs to accessed from persistent storage, the entire data block containing the row is be copied into a data block buffer in volatile memory of a database server. A data block usually contains multiple rows, and control and formatting information, e.g. (offsets to sequences of bytes representing rows or other data structures, list of transactions affecting a row, SCN of a recent change to the data block).

Generating a System Change Number (SCN)

A system change number (SCN) is a number that may be assigned to a particular data block to identify the logical time when the particular data block was changed at a node. For example, when a node changes a row stored in the particular data block in the node's cache, the node may generate an SCN and associate the SCN with the particular data block. The data block in a node's cache (e.g. volatile memory) that has been changed is referred to herein as a "dirty" data block.

According to an embodiment, an SCN may be used to determine the relative "age" of changes made to different data blocks at the node. For example, if one SCN is associated with the change made to one data block and another SCN is associated with the change made to another data block, the larger SCN is going to identify the change that took place later in time than the change identified by the smaller SCN.

A node may maintain a list of "dirty" data blocks ordered by the SCNs associated with the changes made to the data blocks. For example, the list of "dirty" data blocks may be ordered so that the "oldest" dirty data block is listed at the beginning of the list, whereas the "youngest" dirty data block is listed at the end of the list.

Generating a Checkpoint System Change Number

The checkpoint system change number (checkpoint SCN) is the oldest SCN associated with a dirty data block at a node. For example, the checkpoint SCN may be the smallest SCN among the SCNs associated with the "dirty" data blocks maintained by the node. The checkpoint SCN may represent the oldest change made to a data item that produced the "oldest" dirty data block at the node.

According to an embodiment, if the node has two "dirty" data blocks residing in the node's cache, the node may have a list of two dirty data blocks ordered by their respective SCNs. The checkpoint SCN may be associated with the "oldest" dirty data block residing in the node's cache, i.e. the "oldest" dirty data block on the list of dirty data blocks maintained by the node.

Computing a Global Checkpoint System Change Number

The global checkpoint system change number (global checkpoint SCN) is the oldest checkpoint SCN associated with a dirty data block in the entire network of nodes. For example, the global checkpoint SCN may be computed as the minimum of checkpoint SCNs maintained by the nodes in the network, and may represent the "oldest" change made to a data item that produced the "oldest" dirty data block in the entire network of nodes.

According to an embodiment, if the network has two nodes and each of the nodes has a list of "dirty" data blocks, each of the nodes may maintain its respective checkpoint SCN associated with the "oldest" dirty data block residing in the node's cache. The global SCN may be computed as the minimum of the checkpoint SCNs maintained by the nodes. The global checkpoint SCN may be associated with the "oldest" dirty data block residing in the caches of the nodes.

FIG. 1 is a flow chart depicting a process of generating a global checkpoint system change number according to an embodiment of the present invention. In step 104, each node generates a checkpoint system change number (checkpoint SCN), which is the SCN associated with the "oldest" dirty data block at the node. According to an embodiment, the node may generate the checkpoint SCN by finding the smallest SCN among the SCNs associated with the "dirty" data blocks on the list of "dirty" data blocks maintained by the node.

In step 106, a multi-node database server generates a global checkpoint system change number (global checkpoint SCN), which is the "oldest" checkpoint SCN associated with the "oldest" dirty data block in the entire network of nodes. The global checkpoint SCN may be computed as the minimum of checkpoint SCNs maintained by the nodes in the network, and may represent the "oldest" change made to a data item that produced the "oldest" dirty data block in the entire network of nodes.

Computing a Snapshot Query

A snapshot query requires computation that is consistent with a past database state that existed at a particular time, referred to as the snapshot time. The snapshot query may identify the snapshot time by, for example, specifying an SCN for the snapshot time. Like other kinds of queries, computation of a snapshot query entails accessing data blocks. When a node computing the snapshot query accesses a data block, the node may have to first obtain a global lock on the data block.

According to an embodiment of the present invention, when computing a snapshot query, the snapshot time of the snapshot query is compared to the global checkpoint SCN. If the snapshot time is less than the global checkpoint SCN, the snapshot query is computed without obtaining global locks on the data blocks accessed to compute the query. However, if the snapshot time is greater than the global checkpoint SCN, the snapshot query is computed only by obtaining global locks on the data block accessed to compute the query. Since obtaining global locks is expensive and time consuming, computing a snapshot query in the later case is more complex than computing a snapshot query in the first case.

Figure 2:
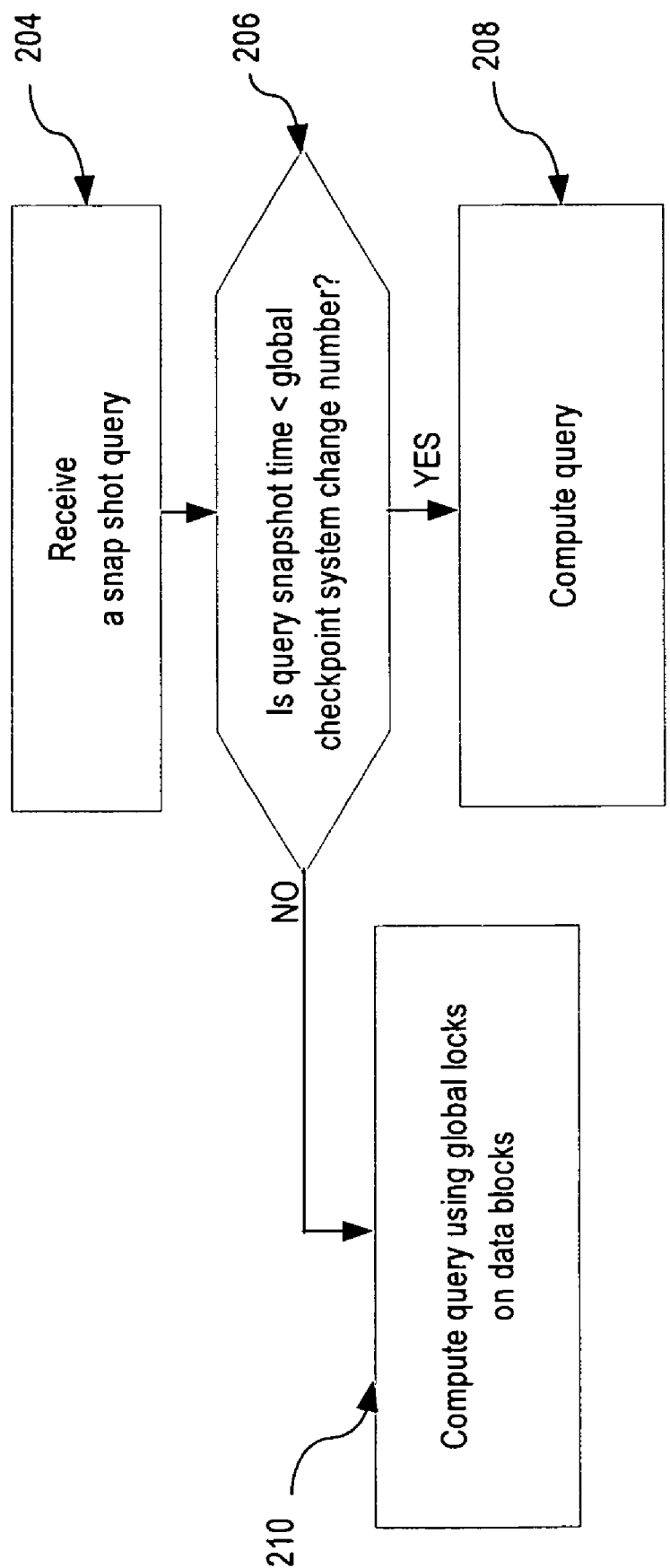
FIG. 2 is a flow chart depicting a process of computing a snapshot query using a global checkpoint system change number according to an embodiment of the present invention.

FIG. 2 is a flow chart depicting a process of computing a snapshot query using a global checkpoint system change number according to an embodiment of the present invention. In step 202, the database server receives a snapshot query request from a node in the network. The snapshot query may specify the snapshot time to identify the point in time of the data block needed to compute the query.

In step 206, the multi-node database server compares the snapshot time included in the snapshot query request with the global checkpoint SCN. According to an embodiment, if the snapshot time is less than the global checkpoint SCN, the snapshot is computed without obtaining global locks on the data blocks. However, if the snapshot time is greater than the global checkpoint SCN, the node may have to obtain a global lock on the data block.

In step 208, the multi-node database server computes the snapshot query. In this step, the multi-node database server does not have to request a global lock on the data block because the snapshot time included in the snapshot query was less than the global checkpoint SCN. Therefore, the query may be computed from the data block is not "dirty," and most likely to be present in the persistent storage (e.g. on the disk).

However, if the server proceeds to step 210, then the server computes the snapshot query using global locks on data blocks. This route is less desirable than step 208 because obtaining global locks for data blocks is expensive and time consuming. It may entail executing instructions, creating data structures for the locks, processing inter-node communication in the form of messages transmitted between the nodes, awaiting until the global "exclusive write lock" is relinquished, etc.

Hardware Overview

Figure 3:
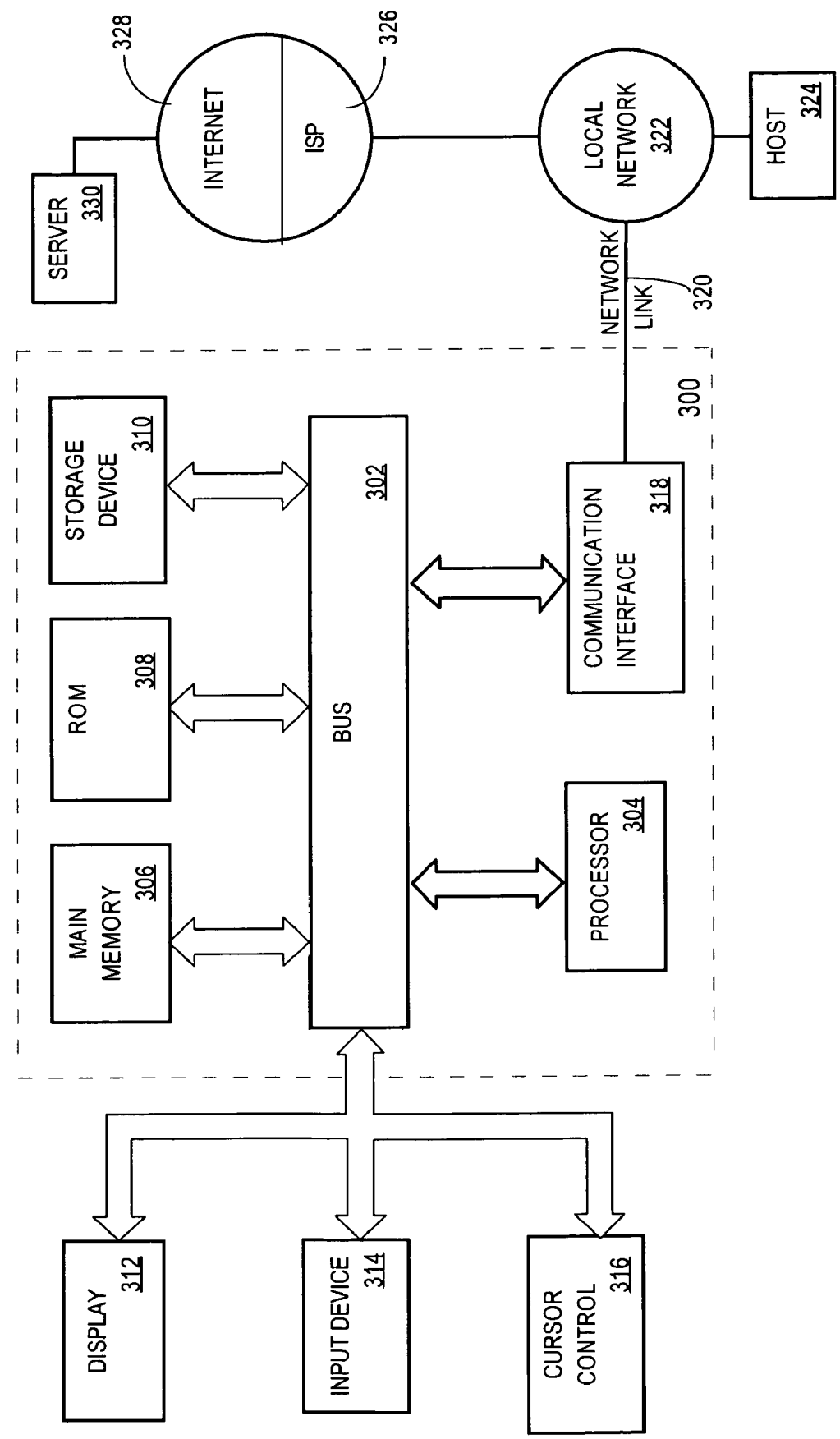
FIG. 3 is a block diagram of a computer system that may be used to implement an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to an embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   a multi-node database server computing a snapshot query associated with a snapshot time, wherein said multi-node database server manages access to a database comprising database data blocks;
   said multi-node database server generating a global checkpoint system change number, wherein any data block of said database data blocks that is associated with a system change number that is less than said global checkpoint system change number is stored persistently in said database;
   wherein computing said snapshot query comprises:
   said multi-node database server determining whether said snapshot time is less than said global checkpoint system change number;
   when said snapshot time is less than said global checkpoint system change number, said multi-node database server accessing data blocks of said database data blocks without obtaining a global lock for any of said data blocks of said database data blocks; and
   when said snapshot time is greater than said global checkpoint system change number, said multi-node database server accessing data blocks of said database data blocks, and obtaining a global lock on said data blocks of said database data blocks to access any of said data block of said database data blocks.

2. The method of claim 1,
   wherein each node of said multi-node database server maintains a list of dirty data blocks, each data block of said list of dirty data blocks being associated with a system change number of a change to said each data block; and
   wherein the step of generating a global checkpoint system number comprises determining a minimum system change number of said system change numbers associated with said list of dirty data blocks.

3. The method of claim 2, wherein the step of generating a global checkpoint system change number further comprises:
   said each node of said multi-node database server generating a checkpoint system change number, wherein any data block in said database that is associated with a system change number generated by said each node that is less than the checkpoint system change number of said node has been stored persistently by said each node; and
   determining a minimum of the checkpoint system change numbers generated by the nodes of said multi-node database server.

4. A non-transitory computer-readable storage medium storing one or more sequences of instructions which, when executed by one or more processors, cause the one or more processors to perform the method recited in claim 3.

5. A non-transitory computer-readable storage medium storing one or more sequences of instructions which, when executed by one or more processors, cause the one or more processors to perform the method recited in claim 2.

6. A non-transitory computer-readable storage medium storing one or more sequences of instructions which, when executed by one or more processors, cause the one or more processors to perform the method recited in claim 1.

7. A computer-implemented method, comprising:
   each node of a multi-node database server, that manages access to a database comprising database data blocks, generating a checkpoint system change number, wherein any data block of said database data blocks that is associated with a system change number generated by said each node that is less than the checkpoint system change number of said node has been stored persistently in said database by said each node; and
   said multi-node database server generating a global checkpoint system change number by determining a minimum of the checkpoint system change numbers generated by the nodes of said multi-node database server.

8. The method of claim 7, further comprising:
   computing a snapshot query associated with a snapshot time,
   wherein computing said snapshot query comprises:
   determining whether said snapshot time is less than said global checkpoint system change number;
   when said snapshot time is less than said global checkpoint system change number, accessing data blocks of said database data blocks without obtaining a global lock for any of said data blocks of said database data blocks.

9. The method of claim 8,
   wherein each node of said multi-node database server maintains a list of dirty data blocks, each data block of said list of dirty data blocks being associated with the system change number of a change to said each data block; and
   wherein determining a minimum of the checkpoint system change numbers further comprises determining a minimum system change number of said system change numbers associated with said list of dirty data blocks.

10. A non-transitory computer-readable storage medium storing one or more sequences of instructions which, when executed by one or more processors, cause the one or more processors to perform the method recited in claim 9.

11. A non-transitory computer-readable storage medium storing one or more sequences of instructions which, when executed by one or more processors, cause the one or more processors to perform the method recited in claim 8.

12. The method of claim 7, further comprising:
   computing a snapshot query associated with a snapshot time, wherein computing said snapshot query comprises:
determining whether said snapshot time is greater than said global checkpoint system change number;
when said snapshot time is greater than said global checkpoint system change number, obtaining a global lock on said data blocks of said database data blocks to access any of said data block of said database data blocks.

13. A non-transitory computer-readable storage medium storing one or more sequences of instructions which, when executed by one or more processors, cause the one or more processors to perform the method recited in claim 12.

14. A non-transitory computer-readable storage medium storing one or more sequences of instructions which, when executed by one or more processors, cause the one or more processors to perform the method recited in claim 7.

* * * * *